Aug. 8, 1961     J. O. LARSSON     2,995,080
BANDING MACHINES
Filed Jan. 31, 1955     4 Sheets-Sheet 3
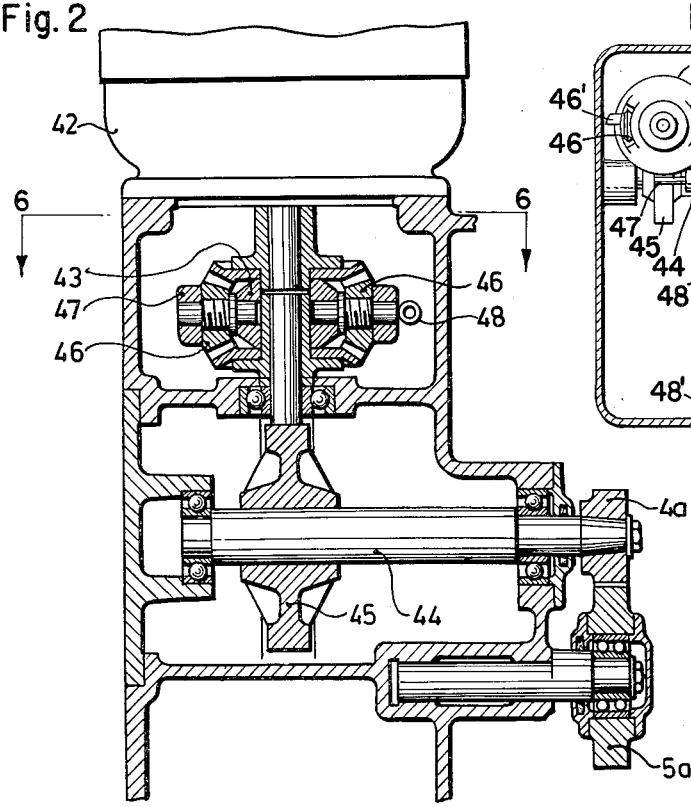
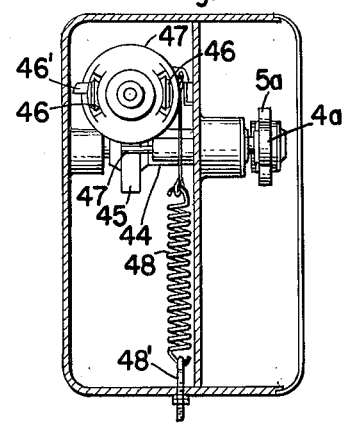
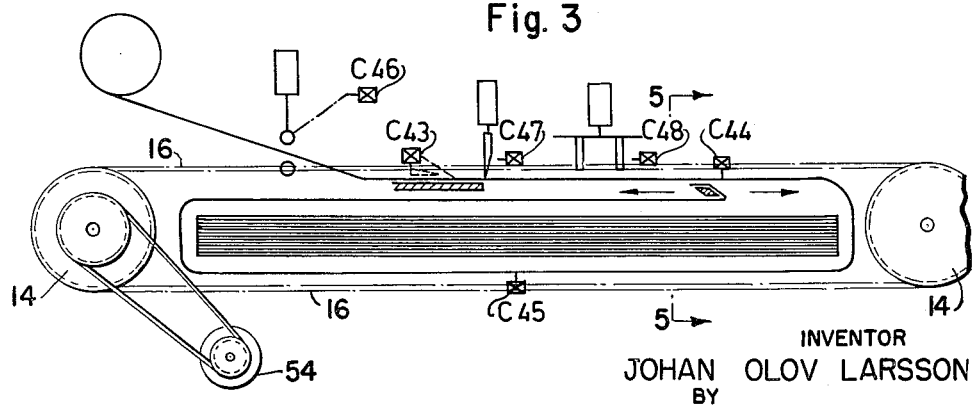
INVENTOR
JOHAN OLOV LARSSON
BY
ATTORNEYS

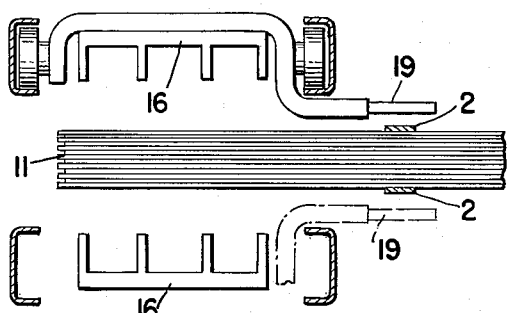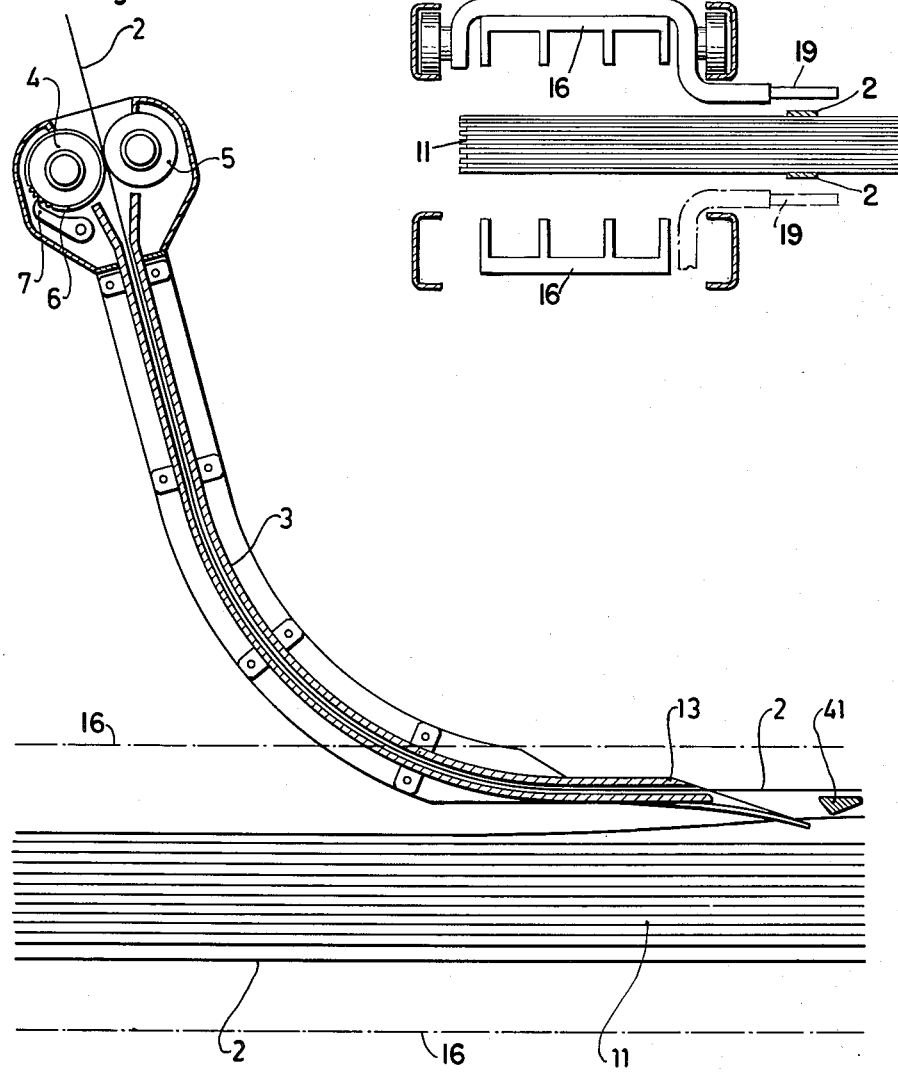

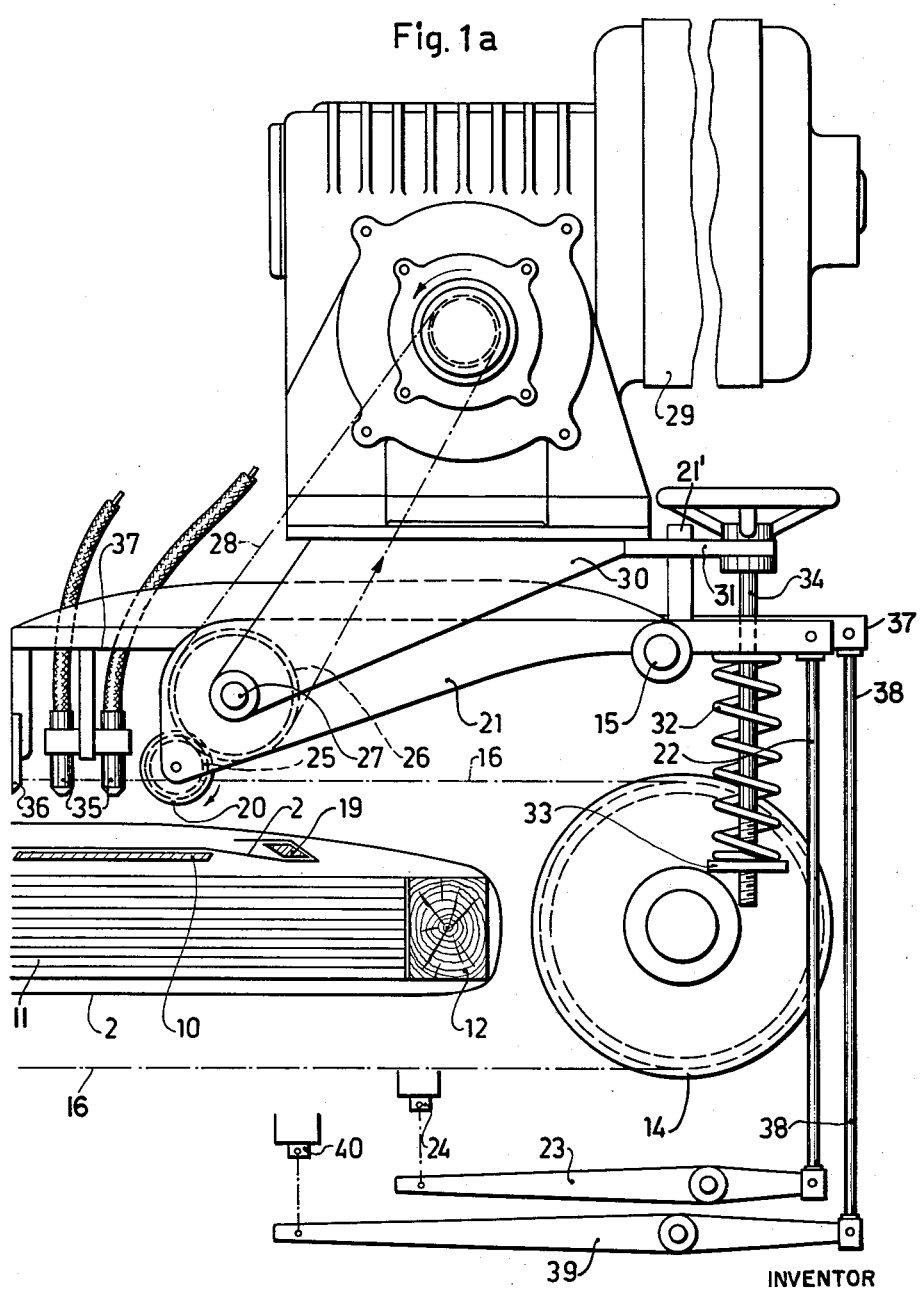

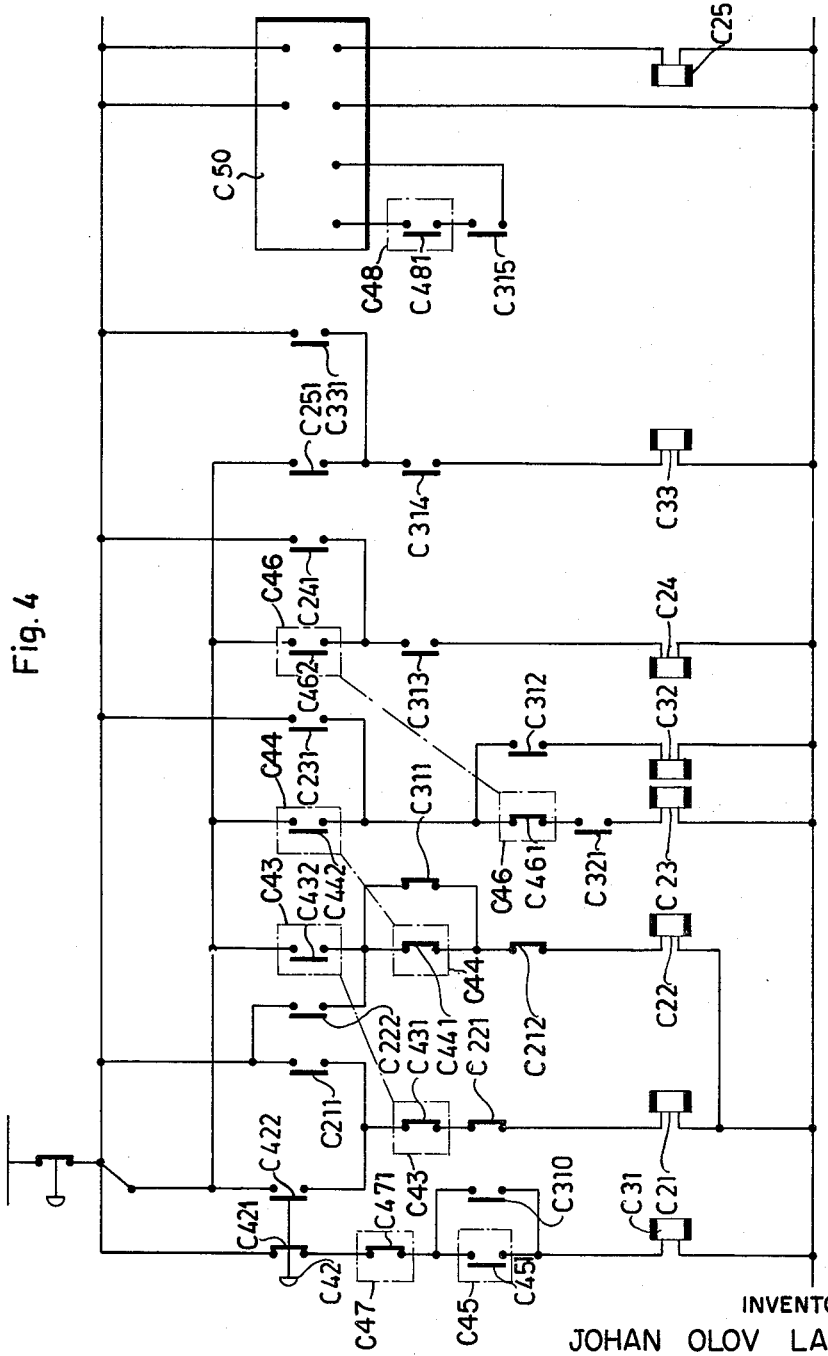

United States Patent Office 2,995,080
Patented Aug. 8, 1961

2,995,080
BANDING MACHINES
Johan Olov Larsson, Kyrkogatan 4, Gavle, Sweden
Filed Jan. 31, 1955, Ser. No. 485,081
Claims priority, application Sweden Feb. 2, 1954
2 Claims. (Cl. 100—27)

The present invention relates to banding machines for applying a banding material, such as metal strappings, wires or the like around objects, e.g. piles of fiberboard sheets, in which a banding material, such as a strip or wire, is drawn from a banding material supplying device by means of a banding material engaging member attached to a power-driven, endless chain surrounding the object, and wound around the object, whereupon the ends of the length of banding material surrounding the object are joined together in an overlapping zone by means of a joining device. This invention is characterized by power-driven tensioning means adapted, after the banding material has been wound around the object and before the ends of the length of banding material surrounding the object are joined together, to engage one or both of the ends of said length so that the banding material will tightly enclose said object.

After tensioning the length of banding material the joining operation may take place in any suitable manner, e.g. by spot welding or by otherwise joining together the overlapping ends of the length of banding material. To tension the length of banding material, the banding material engaging member may be employed, if the feed of the banding material from the banding material supplying device is stopped and said member is allowed to continue in its banding material applying movement carried by the endless chain for a further distance until the desired tensioning of the banding material is obtained, whereupon the joining operation is performed and the portion of banding material issuing from the banding material supplying device is cut off behind the joining region.

Tensioning of the length of banding material may also be achieved after the banding material has been wound around the object, by the step of reversing the feed of the banding material issuing from the banding material supplying device by means of a mechanism associated with the banding material supplying device until the desired tensioning of the banding material is attained. It is also possible to provide the desired tensioning of the banding material by a combination of a continued movement of the banding material engaging member and a simultaneous reversal of the feed of the banding material through the supplying device. To effect the latter movement, the banding material may be drawn between e.g. a pair of clamping rollers, which permit feed of the banding material as long as feed of the banding material shall take place in order to wind the banding material around the object with a certain amount of overlapping, but when tensioning shall take place are rotated in the opposite direction, so that the banding material is drawn back by the friction of the clamping rollers. The banding material fed from the supplying device may in accordance with this invention be imparted a tensioning in any other manner, e.g. by tensioning means of any suitable type acting between the end of the banding material supplying device and the region of overlapping of said material. It is further possible to effect tensioning of the banding material by tensioning means acting upon the overlying banding material portion ahead of the part of the overlapping portion where joining shall take place. In the latter case, the portion of the banding material issuing from the supplying device may be cut off prior to, simultaneously with or after the joining of the overlapping ends of the length of banding material. In other cases, the cutting operation must occur after the joining operation.

Other features and characteristic of this invention will be apparent from the description below with reference to the appended drawings.

FIGURES 1 and 1a show fragmentary elevation views, partly in section, of a banding machine incorporating this invention;

FIGURE 2 is a cross-section illustrating a modified form of the means for tensioning the banding material;

FIGURE 3 illustrates the banding process diagrammatically;

FIGURE 4 is a circuit diagram;

FIGURE 5 is an enlarged section on line 5—5 of FIGURE 3; and

FIGURE 6 is a horizontal section on line 6—6 of FIGURE 2.

Referring to FIGURES 1 and 2, a metal strip 2 forming the banding material, is fed from a coil thereof through a banding material or strip supplying channel 3 having stop means preventing backward movement of the portion of strip drawn through the channel 3 when the strip is cut off. Said stop means may comprise a pair of clamping rolls 4 and 5 between which the strip passes and which are biased by spring means, not shown in the drawing, into engagement with the strip. The roll 4 is associated with a ratchet wheel 6 engaged by a pawl 7 so that the roll 4 is prevented from turning anti-clockwise to prevent backward feed of the strip 2 after cutting off the strip. If the rolls 4, 5 are also to serve as a means for tensioning the banding material prior to joining and cutting the strip, the arrangement may be such that the stop means is made inoperative and one or both rolls are rotated in direction opposite to that of the strip feed by mechanical means, e.g. by means of an electric motor.

The equipment shown on the drawings is primarily adapted for use in a banding machine in which piles of fiberboard sheets or similar objects 11 are to be provided with a suitable number of strappings, which term is intended to include not only bands or strips but also wires or similar members of metal or other suitable material. The strappings are applied around the sheet pile 11 in the transverse direction of the sheets and to protect the edges of the sheets these may be surrounded by a wooden frame 12 before applying the strappings. During the banding process the sheet pile 11 is supported by suitable means (not shown) in the banding machine in such a position relative to the strip supplying channel 3 and the joining means that the strip will be wound around the sheet pile at the desired location thereon. The feed end 13 of the strip supplying channel 3 will then be located slightly above the top face of the pile.

The banding machine comprises two sprocket wheels 14 around which an endless chain 16 passes. The sprocket wheel 14 is driven from a motor, not shown in the drawing, the speed and direction of rotation of which are determined by the operator. The chain 16 carries a part the free end of which is formed as a strip engaging member 19 adapted to engage the free end of the banding strip 2. In a banding operation the member 19 is initially caused to engage the strip end when this in a position in which it is folded or bent back around the top edge of the feed end 13 of the supplying channel 3. From this position the strip engaging member 19 will draw the strip 2 out of the strip supplying channel 3 for slightly more than one complete turn around the pile 11 until the folded end of the strip arrives in a final position in which the ends of the length of strip surrounding the pile overlap to a certain extent above a supporting rail 10. The apparatus thus far described is shown and described in greater detail in my copending application Serial No. 481,195, filed January 11, 1955, now abandoned.

In the embodiment described, the means for tensioning the strip comprises a tensioning roller 20 which is preferably knurled and is disposed ahead of the region of joining of the strip. The roller 20 is rotatably mounted at one end of a two-armed lever 21 which is pivoted on a shaft 15 mounted in the frame of the machine. The opposite end of the lever 21 is connected to an electromagnetically operated lifting member 24 via a link 22 and a two-armed lever 23 pivotally mounted in the machine frame. The tensioning roller 20 is secured to a gear-wheel 25 which meshes with and is driven by a gear-wheel 26. The wheel 26 is carried by a shaft 27 mounted in the lever 21 and driven by a belt 28 from an electric motor 29 through a speed-reducer. The motor is carried by a frame 30 pivotally mounted on the shaft 27 and having a projecting arm 31 which is supported by the lever 21 by the intermediary of a helical spring 32 one end of which is attached to the lever 21 and the opposite end of which is attached to a washer 33, which in its turn is connected to the arm 31 by means of a rod 34 which is secured to the washer by screw-threads and is rotatably but non-slidably fitted in the arm 31. By this arrangement the frame 30 and hence the motor 29 may be balanced in a predetermined angular position relative to the lever 21. Instead of a balancing spring it is of course possible to utilize other well known balancing arrangements. After the strip 2 is wound around the sheet pile 11 in the manner shown in FIG. 1 the tensioning roller 20 shall be operated to tension the strip surrounding the pile. For this purpose, the supply of current to the electromagnet of the lifting member 24 is discontinued, so that the lever 21 will swing anticlockwise toward the strip 2 under the action of the weight of the lever which is positioned predominatingly at the left-hand side of the shaft 15. Thereby, the tensioning roller 20 will be caused to engage the strip 2 and by the clock-wise rotation of the roller caused by the motor the overlying strip portion 2 will be subjected to tensioning so that the length of strip is caused to tightly enclose the sheet pile 11. The overlapping strip portions will then lie pressed against the supporting rail 10 which will thus serve as a counter support for the roller 20. When the strip is tensioned sufficiently, the tensioning roller 20 will be completely or partly prevented from rotating by the friction against the strip with the result that the right-hand part of the belt 28 is subjected to an additional tensioning force which imparts to the frame 30 a turning moment acting clockwise against the action of the spring 32. The arm 31 will then be swung towards the lever 21 and operates a switch 211 whereby the supply of current to the motor 29 is cut off. However, the tensioning roller 20 is still maintained in engagement with the strip 2 and keeps it tensioned.

By adjusting the tensioning of the spring by turning the threaded rod 34 the maximum amount of turning moment of the tensioning roller 20 may be controlled as desired. In this stage of the operation the joining and cutting of the strip will take place. For this purpose, there are used a pair of spot-welding electrodes 35 and a cutter 36 carried by a second two-armed lever 37 which is mounted alongside the lever 21 and a pivotally supported by the shaft 15. The lever 37 is connected to an electromagnetically operated lifting member 40 via a link 38 and a two-armed lever 39 pivotally mounted in the framework of the machine. When its electromagnet is energized, the lifting member 40 is raised to the position shown on the drawing, so that the lever 37 is swung up with the electrodes 35 and the cutter 36 spaced from the strip 2.

When the tensioning roller 20 has performed its operation and the motor 29 is stopped in the manner explained above, the current supply to the electromagnet of the lifting member 40 is cut off, whereby the lever 37 is released and is swung towards the strip 2 by gravity. The electrodes 35 which are located above the predetermined overlapping region of the strip, said region being disposed above the supporting rail 10, will then, if desired without initial current supply, force the upper strip 2 against the underlying strip portion and simultaneously the cututer 36 will, in cooperation with the counter-cutter 41, cut off the strip behind the overlapping zone whereby the upper strip 2 will without resistance be forced into tight engagement with the lower strip. When this has taken place, the electrodes 35 will be operated to cause welding of the strip portions. Thereupon, the electromagnets of the lifting members 24 and 40 are energized, so that the parts of the machine are caused to rapidly return to their initial positions, as shown in FIG. 1.

The sheet pile 11 is then displaced laterally, so that the engaging member 19, the rail 10 and the counter-cutter 41 will be brought out of engagement with the welded strip. As described in my above mentioned patent application, by subsequent backward movement of the strip engaging member 19, the strip end projecting slightly from the strip supplying channel 3 after the cutting operation will be folded back around the feed end 13 of the channel 3 and the engaging member 19 is then moved further back to cause it to drop behind the folded strip end, so that by reversal of the movement of the member 19 it grips the strip and the strip is drawn forward ready for a further banding operation.

In the embodiment shown in FIG. 2 the above described tensioning means is omitted and tensioning of the strip is achieved by the clamping rolls 4a and 5a which are caused to engage the strip and are rotated in a direction such as to tension the strip. As seen from FIG. 2, only one of the rolls 4a, is mechanically driven, while the other roll 5a is idle and is mounted eccentrically so that it can be swung to a position such as to clamp the strip e.g., by electromagnetic means.

For driving the clamping roll 4a there is provided an electric motor 42, which with the intermediary of a differential gearing 43 drives a worm which engages a worm-wheel 45 rigidly secured to the shaft 44 of the clamping roll 4a. The planet wheels 46 of the differential gearing are carried in a manner well-known in the art by a planet wheel holder 47 which is acted upon by a spring 48 so that the planet wheel holder 47 is permitted to turn only after the torque necessary for drawing back the strip has surpassed a predetermined value determined by the tension of the spring 48 which is suitably adjustable as indicated at 48'. When the retaining effect of the spring 48 is surmounted, the planet wheel holder 47 is turned in a well-known manner. The holder 47 has a projection or lug 46 which after a predetermined angular displacement of the planet wheel holder acts upon a switch 47' which opens the motor circuit.

Once the strip has been welded at the predetermined location the clamping roll 5a may be released by hand so that the strip can be drawn forward again around the object to be banded.

In the following, the operation of the apparatus will be explained in connection with FIGS. 3 and 4, supposing that the strip engaging member 19 is about to start its backward movement in order to fold back the strip end projecting from the strip supplying channel 3 about the feed end of the channel. In this position, the contacts will be in the positions shown in FIG. 4.

To start the operation, the starting pushbutton C42 is depressed, which has a break contact C421 and a make contact C422, thereby operating a relay C21. The relay C21 has a make contact C211 and a break contact C212. Operation of the relay C21 causes a motor 54 to be started which drives the member 19 back-wards. When the member 19 has folded back the strip end, the member 19 actuates a contact device C43 comprising a break contact C431 and a make contact C432. Thereby, the circuit of the relay C21 is opened at the break contact C431 and the motor 54 is reversed by a relay C22 operating via the make contact C432, a break contact C441 included in a contact device C44 and the break contact C212. By the operation of the relay C22 the contact C221 is opened and the contact C222 closed, whereby the relay C22 operates via the contact C222. When during drawing of the strip around the object, the strip engaging member passes the contact device C44, the contact C441 is opened and the contact C442 closed, but since a break contact C311 in parallel with the contact C441 is in a position of rest nothing happens but the drawing of the strip around the object continues. When the strip engaging member arrives at and acts upon a contact device C45 comprising a make contact C451, a relay C31 operates and thereby acts upon make contacts C310, C312, V313, C314 and C315 and a break contact C311. When the contact device C45 has been passed and the contact C451 has opened, the relay C31 is energized via the make contact C310. When the strip has been drawn completely around the object and the strip engaging member arrives again at and acts upon the contact device C44, the contact C441 is opened and the contact C442 is closed. Thereby, the relay C22 releases, which means that the contact C222 is opened whereby the current to the motor is cut off and the strip stops. By closing the contact C442 a relay C32 operates via the previously closed contact C312 whereby a make contact C321 is closed. Thereby, a relay C23 operates over the contact C461 being a break contact in a contact device C46. Operation of the relay C23 causes a make contact C231 to be closed. Thereby the tensioning roller 20 is lowered towards the strip, since the electromagnet controlling the lifting member 24 is without current. Furthermore the motor 29 is started, so that the tensioning roller is rotated as described above to tension the strip. When the strip has been tensioned to the desired extent the motor 29 will be stopped as described above. Thereafter the contact device C46 is operated, so that the relay C23 releases and the contact C231 is opened. Simultaneously a make contact C462 of the contact device C46 is closed whereby the relay C24 operates to open the circuit of the electromagnet of the lifting member 40 and the electrodes 35 are lowered towards the strip by the action of the weight of the lever 37. Operation of the relay C24 causes closing of a contact C241. When the electrodes are lowered, a contact C481 of a contact device C48 is operated to actuate a relay C25 for the welding current over a timer C50. Operation of the relay C25 causes closing of a contact C251 which in its turn causes operation of a relay C33 via the contact C314. Operation of the relay C33 causes closing of a contact C331 and release of the cutter 36. Thereby, the break contact C471 of the contact device C47 is operated, whereby the relay C31 releases and hence the contacts C310, C312, C313, C314 and C315 are opened and the contact C311 closes, which means that all relays and contact devices are returned to their initial positions.

It is, of course, obvious that the invention is not limited to the embodiments shown and described, but may be varied in many ways without departing from the spirit and scope of the invention.

Having now particularly described the nature of my invention and the manner of the operation what I claim is:

1. A banding machine for applying banding material around objects comprising banding material supplying means, endless driven means adapted to surround the object, a banding material engaging member carried by said endless driven means and adapted to engage an end of the banding material to draw banding material from said banding material supplying means, wind it around said object and hold it while the banding material is being tensioned, means for joining the ends of the length of banding material surrounding the object in an overlapping region, and power driven tensioning means operable, after the banding material has been wound around the object and before the ends of the length of banding material surrounding the object are joined together, to engage the uncut end of the length of banding material surrounding the object and pull the same in band tensioning direction including a pair of clamping rollers adapted for clamping the banding material therebetween when the same is to be tensioned, an electric motor operatively connected to one of said clamping rollers for actuating the same, an electric switch connected in electric circuit with said motor for controlling the supply of power thereto, and means operatively interposed between said electric motor and the roller actuated by the latter and automatically responsive to a predetermined tensioning of said banding material for operating said switch and thereby opening the motor circuit including a differential gear assembly having a planetary gear mounting frame, and means yieldably fixing said frame in position.

2. A banding machine for applying banding material around objects comprising banding material supplying means, endless driven means adapted to surround the object, a banding material engaging member carried by said endless driven means and adapted to engage an end of the banding material to draw banding material from said banding material supplying means, wind it around said object and hold it while the banding material is being tensioned, means for joining the ends of the length of banding material surrounding the object in an overlapping region, and power driven tensioning means operable, after the banding material has been wound around the object and before the ends of the length of banding material surrounding the object are joined together, to engage the uncut end of the length of banding material surrounding the object and pull the same in band tensioning direction including a pair of clamping rollers adapted for clamping the banding material therebetween when the same is to be tensioned, an electric motor operatively connected to one of said clamping rollers for actuating the same, an electric switch connected in electric circuit with said motor for controlling the supply of power thereto, and means operatively interposed between said electric motor and the roller actuated by the latter and automatically responsive to a predetermined tensioning of said banding material for operating said switch and thereby opening the motor circuit including a differential gear assembly having a planetary gear mounting frame and means yieldably fixing said frame in position and operable for selectively limiting the torque that can be transmitted through the differential gear assembly without movement of the frame for operating the motor control switch.

References Cited in the file of this patent

UNITED STATES PATENTS

| | | |
|---|---|---|
| 2,194,108 | Wright | Mar. 19, 1940 |
| 2,262,232 | Harvey | Nov. 11, 1941 |
| 2,597,675 | Sackett | May 20, 1952 |
| 2,608,150 | Cranston | Aug. 26, 1952 |
| 2,614,487 | Cheesman | Oct. 21, 1952 |
| 2,655,097 | Fons et al. | Oct. 13, 1953 |
| 2,688,830 | Halahan et al. | Sept. 14, 1954 |
| 2,882,814 | Winkler et al. | Apr. 22, 1959 |